United States Patent [19]

Gibson et al.

[11] 4,263,611

[45] Apr. 21, 1981

[54] TELEVISION SIGNAL PROCESSING SYSTEM

[75] Inventors: Walter G. Gibson, Princeton; Frank C. Liu, Kendall Park, both of N.J.; Max W. Muterspaugh, Indianapolis, Ind.

[73] Assignee: RCA Corporation, New York, N.Y.

[21] Appl. No.: 70,903

[22] Filed: Aug. 29, 1979

[51] Int. Cl.³ .......................... H04N 9/50; H04N 5/50
[52] U.S. Cl. ........................................ 358/23; 358/25; 358/195.1
[58] Field of Search ................... 358/191.1, 195.1, 21, 358/196, 188, 23, 25; 329/50; 455/258, 263

[56] References Cited

U.S. PATENT DOCUMENTS

| | | | |
|---|---|---|---|
| 3,697,685 | 10/1972 | Lunn | 358/195.1 |
| 3,968,325 | 7/1976 | Beriere | 358/195.1 |
| 4,159,482 | 6/1979 | Apeldoorn | 358/195 |
| 4,188,639 | 2/1980 | Murakami et al. | 358/25 |

OTHER PUBLICATIONS

Toshiba Television Schematic, No. 13P30E.
Philips Technical Information Pamphlet 034 For Circuits TDA 2540 and TDA 2541, 1977.
Buergerhausen, "TV IF Amplifier With Improved Synchronous Detection", *IEEE Transactions BTR*, Nov. 1974, pp.279-284.

Primary Examiner—John C. Martin
Attorney, Agent, or Firm—P. J. Rasmussen; W. H. Meagher; W. B. Yorks, Jr.

[57] ABSTRACT

A selectivity network is provided for a synchronous detector, a reference signal circuit, and an AFT circuit. The selectivity network comprises a first tuned circuit coupled across two terminals of the reference signal circuit and tuned to the desired frequency of the I.F. picture carrier. A second tuned circuit is lightly coupled to the first tuned circuit and is coupled across two inputs of the AFT circuit to provide a frequency dependent phase-sifted reference signal to the AFT circuit. The first tuned circuit includes a trap circuit tuned to provide attenuation about a frequency intermediate the frequency of a sound carrier and that picture signal sideband frequency which, upon detection, results in a video signal corresponding to the intercarrier sound second subharmonic frequency. The trap in the reference signal tuned circuit minimizes quadrature distortion in the reference channel and the resultant harmonic distortion in the video signals, which causes sound buzz. The frequency notched reference signal is applied to the AFT tuned circuit, which causes a balancing of the pull-in range of the AFT circuit about the desired picture carrier frequency, thereby immunizing the AFT circuit against noise-pulling. The frequency notch in the AFT circuit at the indicated frequency also minimizes AFT effects of a frequency offset co-channel sound carrier, allowing the automatic acquisition of signals which are offset in frequency toward the lower adjacent channel.

7 Claims, 9 Drawing Figures

TELEVISION SIGNAL PROCESSING SYSTEM

This invention relates to synchronous detector and automatic fine tuning circuits and, in particular, to a common selectivity network including a tuned circuit which simultaneously reduces harmonic distortion in a synchronous detector and improves the noise immunity and offset carrier tuning ability of an automatic fine tuning circuit.

The synchronous detection process has tantalized television receiver designers for a number of years, due to its advantages over the widely-used envelope detector in areas such as improved linearity, operation at low signal levels, and the simultaneous detection of both video and intercarrier sound signals. Unfortunately, the implementation of synchronous detection is difficult and expensive due to its precision and complexity.

However, with the advent of television integrated circuit technology, synchronous detection has become competitive with envelope detection on a cost and a performance basis. The synchronous demodulator is generally configured as a double-balanced product detector, in which the intermediate frequency (I.F.) signal is multiplied by a reference, or switching signal. When the reference signal is a spectrally-pure sinusoid of exactly the same frequency and phase as the I.F. picture carrier, or an amplitude-limited version thereof, the aforementioned advantages of synchronous detection are realized.

If the reference signal is produced by an unmodulated picture carrier, or a picture carrier with balanced double sidebands, a spectrally-pure, amplitude-limited swtiching signal is produced. However, the reference signal is typically derived from the I.F. signal which is applied to the product detector in order to maintain an accurate phase match of the reference signal to the I.F. picture carrier. The I.F. signal is applied to a reference channel circuit with selectivity in the vicinity of the picture carrier to develop the reference signal. The I.F. signal at the input to the reference channel is therefore neither an unmodulated carrier nor a double sideband signal, but, due to the I.F. selectivity and the vestigial nature of the transmitted signal, is an asymmetrical sideband signal with the low frequency video appearing as an unbalanced double sideband signal and the higher frequency components appearing as a single sideband signal. The I.F. picture carrier, with its asymmetrical sidebands, will result in the generation of an inphase and quadrature component in the reference channel signal which, when applied to the product detector, generates detected video and intercarrier sound signals with harmonic distortion. The harmonics of certain video signals will appear at the 4.5 MHz frequency of the intercarrier sound signal, thereby producing a buzz in the sound channel. For example, a video signal at 2.25 MHz (the second subharmonic of the intercarrier sound signal), and a video signal at 1.5 MHz (the third subharmonic of the intercarrier sound signal) can have significant harmonics which appear at the intercarrier sound signal frequency (4.5 MHz).

The reference signal developed in the reference channel may also be advantageously used in conjunction with a double-balanced phase comparator to generate an automatic fine tuning signal. The reference signal is coupled to the phase comparator by a first, direct path, and by a second path which includes a tuned circuit. The tuned circuit imparts a frequency dependent phase shift to the reference signal so that the two signals which are applied to the phase comparator will be in quadrature when the I.F. picture carrier is at the correct frequency. When the picture carrier varies from its desired frequency, the applied signals will not be in quadrature, and the outputs of the phase comparator will change, enabling the development of a correction voltage for the tuner.

Several factors must be considered in the design of the automatic fine tuning (AFT) circuit. The asymmetrical Nyquist bandpass of the I.F. filter referred to above can result in the production of an AFT response characteristic which exhibits a greater pull-in range toward mid-band. This unbalanced response characteristic will cause the AFT voltage to drift toward mid-band tuning due to noise, since I.F. noise has a frequency spectrum centered around mid-band. Thus, it is desirable to design the AFT circuit so that a balanced response characteristic is produced.

It is also desirable to design the AFT system so that the television receiver is capable of acquiring and holding signals received from master antenna (MATV) and cable television (CATV) systems. These systems are generally unregulated as to frequency offsets, and are known to produce incidental phase modulations and frequency offsets whereby the carriers vary from the normal broadcast frequencies by as much as ±2 MHz. A 2 MHz offset television signal can be acquired by a frequency synthesizer (FS) tuning system, such as that shown in U.S. Pat. No. 4,031,549, when used in conjunction with a properly designed AFT system. The FS tuning system includes a phase locked loop (PLL) containing a voltage controlled local oscillator. The frequency of the signal produced by the local oscillator tunes the receiver to the desired channel. The local oscillator will first tune the receiver to the standard broadcast frequency for the selected channel. The PLL will then operate under the control of the AFT signal, and the tuner will search for the picture carrier of the desired channel over a frequency range centered about the standard frequency location. If no signal is acquired, the tuning system will step the local oscillator up in frequency by 1 MHz, then down in frequency by 1 MHz, and search frequency ranges about these local oscillator frequencies. It may be seen that, in order to acquire a 2 MHz offset signal, the AFT circuit must be able to direct the tuner to a carrier which is 1 MHz away from the stepped up or stepped down local oscillator frequency. Thus, the AFT system must have a ±1 MHz range which, when combined with the ±1 MHz range of the FS tuning system, is capable of acquiring signals offset from standard broadcast frequencies by ±2 MHz.

The pull-in range of any AFT system is unavoidably limited in the direction of the lower adjacent channel by the lower adjacent sound trap and the Nyquist slope of the I.F. selectivity network. For frequency offsets toward the lower adjacent channel, the amplitude of the I.F. picture carrier will fall off quickly, and the co-channel sound carrier will come up in amplitude as it is located in the I.F. passband instead of the co-channel sound trap. When I.F. picture carrier of the desired channel has a 1 MHz offset, the reduced picture carrier and the exalted co-channel sound carrier can both be at the outer extremes of the AFT pull-in range, thereby producing equal and opposite tuning correction voltages in the AFT system. The tuning voltages thus produced will balance each other, and the AFT system will provide a tuning voltage to the tuner which will not change the tuning of the receiver. The tuning system will therefore be locked in a condition in which it is unable to acquire the offset signal. Thus, it is desirable to design the AFT circuit so that it is capable of acquiring and holding signals if the tuner local oscillator has drifted or otherwise is not at the correct frequency, for errors up to 1 MHz.

An AFT system should also require as small a number of simple tuned circuits as possible. This is because the AFT system is part of a closed loop system, including the tuner, I.F. amplifiers, and AFT detector and amplifiers. Under high gain conditions, the poles and zeroes of the reactive elements of the loop, including the I.F. selectivity network and the AFT detector, can combine to create resonance points at which the loop becomes unstable. The problem is compounded in an FS tuner system, since the FS tuner includes an integrator in the PLL having several time constants of its own. These instability problems can be reduced by reducing the number of poles and zeroes in the AFT loop through the use of simple tuned circuits whenever tuned circuits are required.

In accordance with the principles of the present invention, a selectivity network is provided for a synchronous detector reference channel and an AFT circuit which contains a trap in the reference tuned circuit for producing attenuation about a trapping frequency intermediate the frequency of a sound carrier and that picture signal sideband frequency which, upon detection, results in a video signal corresponding to the intercarrier sound second subharmonic frequency. The selectivity network comprises a first tuned circuit coupled across the reference channel circuit and tuned to the frequency of the I.F. picture carrier. A second tuned circuit is lightly coupled to the first tuned circuit and is coupled across two inputs of the AFT circuit to provide a frequency-dependent phase-shifted reference signal to the AFT circuit. The first tuned circuit includes a trap circuit tuned to the aforementioned trapping frequency. The trap in the reference channel tuned circuit attenuates those picture signal sideband frequencies in the reference channel which, upon detection, result in video signals located at the second and third subharmonic frequencies of the intercarrier sound signal, thereby minimizing quadrature distortion in the reference channel and the resultant harmonic distortion in the video signals, which causes sound buzz. The frequency notched reference channel signal is coupled to the AFT tuned circuit, which causes a balancing of the pull-in range of the AFT circuit about the picture carrier frequency, thereby immunizing the AFT circuit against noise-pulling. The frequency notch in the AFT circuit at the indicated frequency also minimizes AFT effects of a frequency offset co-channel sound carrier, allowing the automatic acquisition of signals which are offset in frequency toward the lower adjacent channel.

Figure 1:
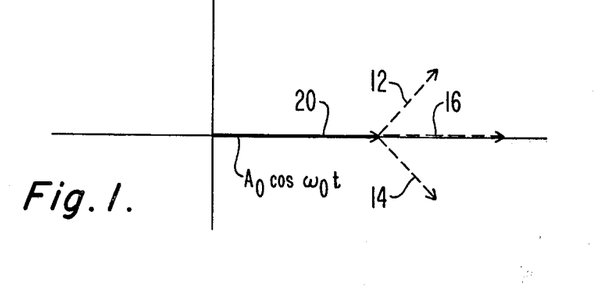
FIG. 1 is a phasor diagram of a carrier reference signal.

Referring to FIG. 1, a phasor diagram is shown, with signals referenced to a picture carrier 20 having a frequency of $\omega_o$ radians per second. The picture carrier may be expressed mathematically as:

$$A_o \cos \omega_o t.$$

If the reference signal circuit of a synchronous detector contains only this carrier signal, perfect synchronous detection will result, with the detected video signal being an exact replica of the original composite video signal, free of quadrature distortion. Similarly if the reference circuit also contained balanced double sidebands 12 and 14, their resultant 16 would fall along the axis of the carrier phasor. The resultant signal could then be amplitude-limited to again produce a perfect reference signal for the synchronous detector. However, since the video signal is a vestigial sideband signal, such balanced sidebands do not occur.

Figure 2:
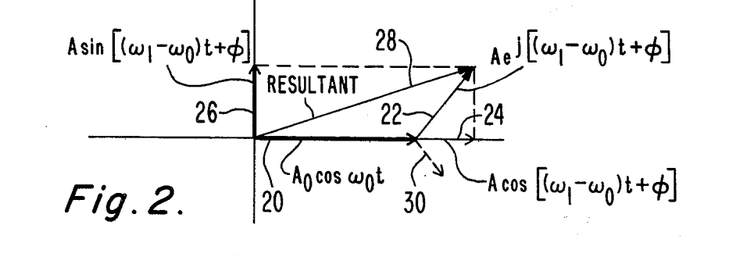
FIG. 2 is a phasor diagram of a carrier reference signal with sideband modulation.

Vestigial sideband modulation will result in the production of a reference signal shown in the phasor diagram of FIG. 2. The picture carrier 20 is of the same form as in FIG. 1. A video sideband is shown of the form $$Ae^{j[(\omega_1-\omega_o)t+\phi]}$$

where $\omega_1$ is the signal frequency and $\phi$ is a static phase shift due to the reference tank circuit. For frequencies beyond the Nyquist slope of the I.F. passband, the video sideband will be a single sideband as shown by phasor 22. This sideband can be resolved into two components: an inphase phasor 24 of the form $$A \cos [(\omega_1-\omega_o)t+\phi]$$

and a quadrature phasor 26 of the form $$A \sin [(\omega_1-\omega_o)t+\phi].$$

The resultant switching signal is a phasor 28, which will cause quadrature distortion in the detector due to the orthogonal quadrature component. When the I.F. signal is demodulated by this resultant reference signal 28, the video signal will be distorted in like manner to a video signal demodulated by an envelope detector. One of the primary advantages of a synchronous detector, high linearity, is lost.

If the reference circuit uses a tuned circuit with a very narrow passband, some of the quadrature distortion will be reduced. The Nyquist slope of the I.F. passband will still produce unequal sidebands on either side of the picture carrier, as shown by phasors 22 and 30. The resultant switching signal will accordingly have a smaller quadrature component, which will produce less distortion in the detected video signal.

Narrowing the passband of the reference tuned circuit is generally done by increasing the Q of the circuit, which creates other problems. The narrow passband makes tuning critical; if the signal frequency shifts, the picture carrier can move entirely out of the passband and video detection will cease. Also, the reference tuned circuit will produce a static phase shift over its passband, equal to approximately ±45 degrees at the 3 db points of the circuit. Reference signal circuits thus must compromise the quadrature distortion produced by the Nyquist slope of the I.F. passband in light of the problems of tuning inaccuracies and static phase shift. This compromise results in the use of a reference signal circuit with a relatively wide bandwidth.

Figure 3:
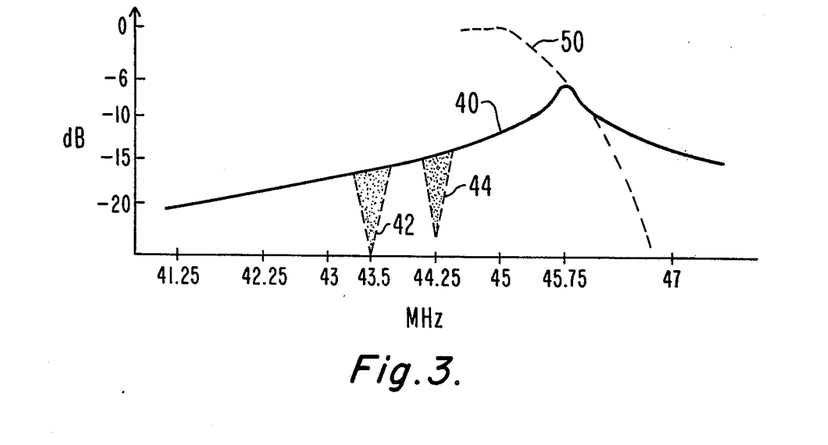
FIG. 3 illustrates the passband of a typical reference signal circuit.

FIG. 3 illustrates a typical response curve 40 of a reference signal circuit. The tuned circuit is tuned to the 45.75 MHz frequency of the picture carrier for use in the NTSC television system. Superimposed on the response curve 40 is the Nyquist slope portion 50 of the I.F. passband, which causes a sharp rolloff of signal frequencies above 45.75 MHz.

The presence of quadrature distortion in the reference signal will produce harmonic distortion in the detected video signal. Specifically, quadrature distortion resulting from 43.5 MHz sidebands in the reference signal will produce second harmonics of the resultant baseband video signal of 2.25 MHz. The second harmonic of this signal will fall at 4.5 MHz, the frequency of the detected intercarrier sound signal. Although these second harmonics will have an amplitude which is only 14 percent of that of the fundamental, these small signals are sufficient to cause a buzz in the sound signal. A similar but lesser effect results from sidebands with an I.F. frequency of 44.25 MHz, which will have third harmonics appearing in the intercarrier sound signal. Ideally, it would be desirable to attenuate these frequencies in the reference circuit, as illustrated by the dashed notches 42 and 44 in the response curve of FIG. 3. But in accordance with the present invention, a solution to this problem is presented which simultaneously solves problems in other areas of the television receiver as well.

Figure 4:
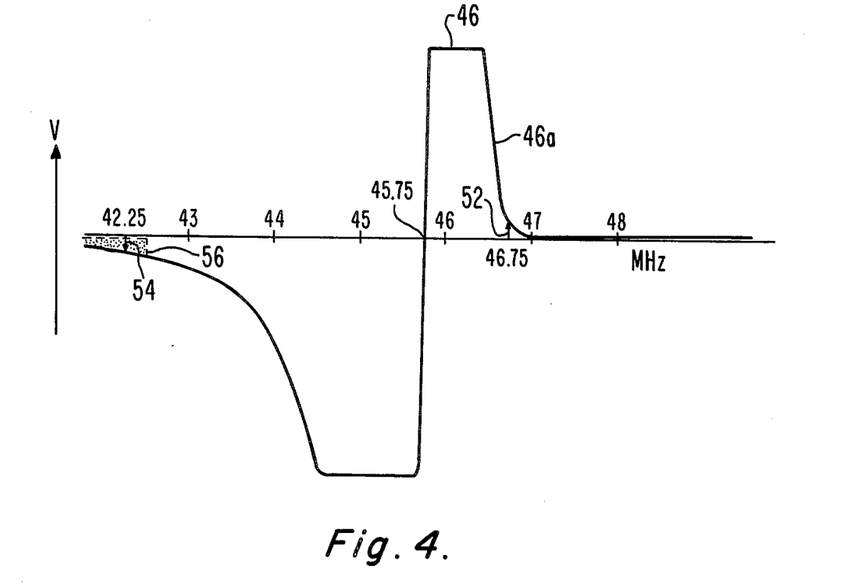
FIG. 4 illustrates the response characteristic of a typical AFT circuit.

A typical AFT response characteristic 46 is shown in FIG. 4. The response characteristic is shaped to exhibit a sharp response for picture carrier frequency variations in the vicinity of its desired frequency location of 45.75 MHz. The upper slope 46a of this curve is seen to roll off quickly due to the location of the 47.25 adjacent channel sound trap in the I.F. filter network. Below the picture carrier frequency and toward the middle of the I.F. band, the response characteristic is seen to have more gradual rolloff. This response characteristic will result in what is known as "noise pulling". Under weak or no signal conditions, the AFT circuit will correct the tuner toward mid-band, since the average frequency of I.F. noise is located at approximately 43.5 MHz and the area under curve 46 is greater below 45.75 MHz than it is above that frequency. It is thus desirable for the AFT response characteristic to be balanced about the picture carrier frequency, so that the AFT circuit will produce a 45.75 MHz tuning voltage under weak or no signal conditions.

Figure 5:
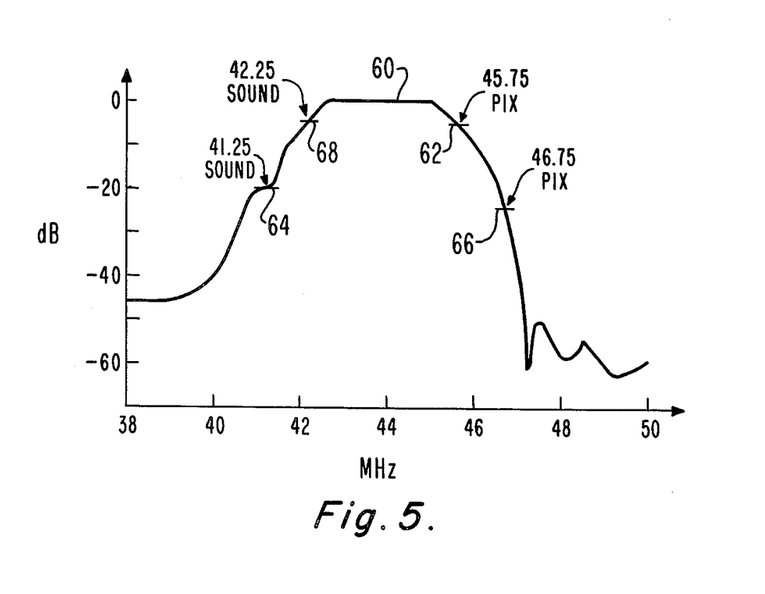
FIG. 5 illustrates the locations of normal and offset sound and picture carriers in a typical I.F. passband.

A typical I.F. passband response characteristic 60 is shown in FIG. 5. When the television receiver is properly tuned, the picture carrier will be located at 45.75 MHz as shown at 62, 6 db down from the flat top of the passband 60 on the upper Nyquist slope of the passband. The sound carrier at 41.25 MHz will then be located as shown at 64, down approximately 20 db from mid-band amplitude. When these carriers are applied to an AFT circuit having the response shown in FIG. 4, the picture carrier will be precisely tuned to 45.75 MHz and the sound carrier will be located at a frequency which is too low to affect the AFT output voltage.

However, when the video signal is shifted upward in frequency by 2 MHz, as may occur when the signal is provided by a MATV or CATV system, only 1 MHz of the offset will be corrected by the tuning system as it searches for the picture carrier. The signals that are supplied to the AFT circuit will still be offset by 1 MHz, as shown by the picture and sound carrier locations at 66 and 68 in FIG. 5. When so located, the 42.25 MHz sound carrier will only be approximately 6 db below mid-band level, and the 46.75 picture carrier will be down by approximately 30 db, as its frequency approaches that of the adjacent channel sound trap. When these carriers are applied to an AFT circuit having the response shown in FIG. 4, the attenuated picture carrier will produce only a small positive tuning voltage, as shown by arrow 52. The exalted frequency shifted sound carrier will be located as shown at arrow 54, where it will produce a small negative contribution to the tuning voltage of similar magnitude to that provided by the picture carrier. These two tuning voltages will cancel each other in effect, and the AFT circuit will thus fail to pull in the offset television signal. If the tuning system produces less than a 1 MHz correction as it searches for the signal, both carriers will move up in frequency, and the tuning voltage component provided by the sound carrier will dominate the picture carrier contribution. The AFT circuit will then try to adjust the tuning so that the receiver will lock up with the sound carrier tuned to the 45.75 picture carrier frequency.

One way to avert this problem is to insert a notch in the AFT response characteristic where the offset sound carrier will be located, as shown by dashed lines 56 in FIG. 4. However, the arrangement of the present invention will successfully solve the offset carrier acquisition problem in a manner which also improves the noise pulling immunity of the AFT circuit while solving the aforementioned sound buzz problem.

Figure 6:
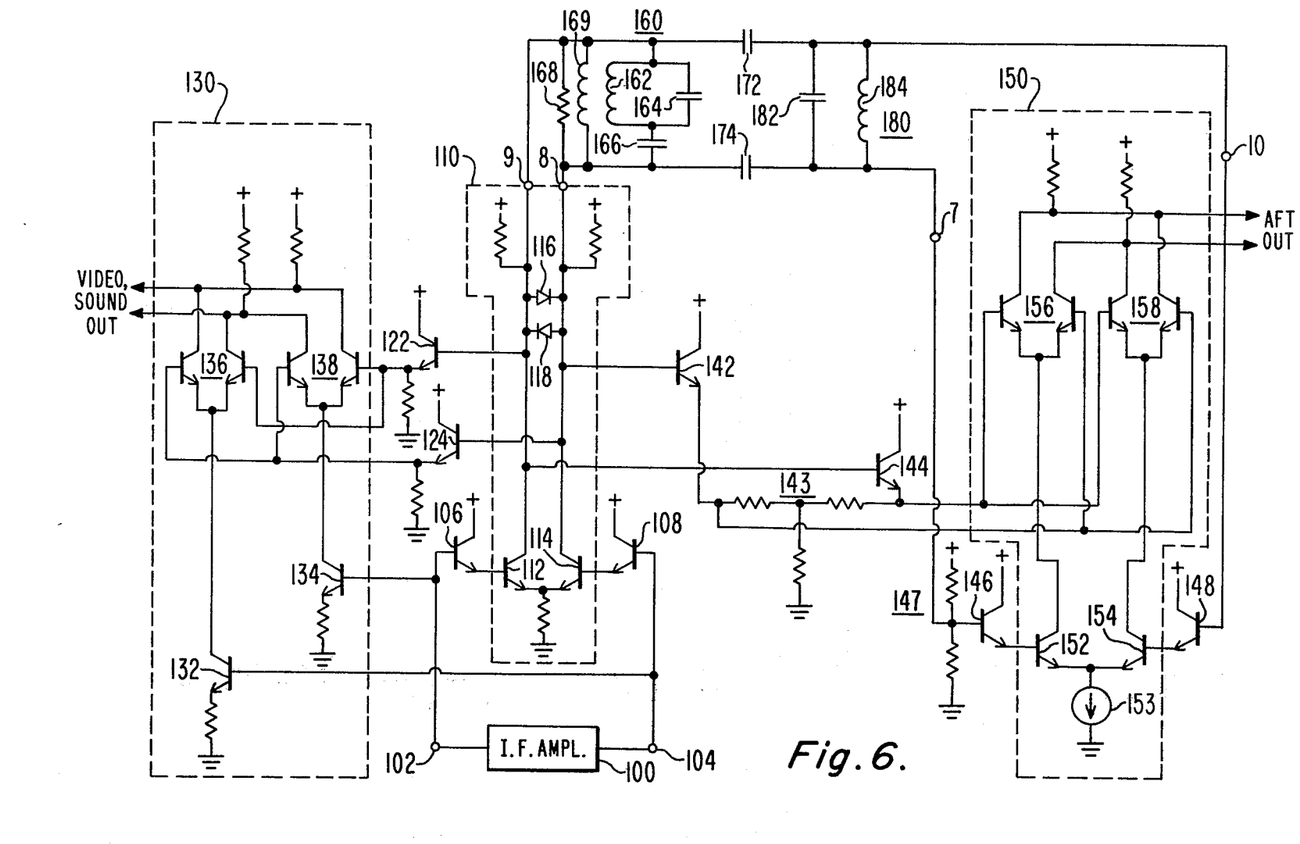
FIG. 6 illustrates, partially in block diagram form and partially in schematic diagram form, a synchronous detector and an AFT circuit constructed in accordance with the principles of the present invention.

A circuit constructed in accordance with the principles of the present invention is illustrated in FIG. 6. The circuitry thereshown may be advantageously manufactured on a single monolithic integrated circuit chip, with the exception of tuned circuit elements 160–184, which are external to the chip and coupled thereto at external chip terminals 7–10.

A double-ended I.F. signal is coupled to internal terminals 102 and 104 from I.F. amplifier 100. The I.F. signal is applied to transistors 132 and 134 of product detector 130 for the synchronous demodulation thereof. The I.F. signal is also applied to a reference signal circuit 110 by way of emitter follower coupled transistors 106 and 108 for the generation of a switching signal for the product detector 130 and an AFT phase comparator 150.

The I.F. signal drives a differential amplifier comprising transistors 112 and 114 in the reference signal circuit 110. Coupled across the collectors of the differential amplifier transistors 112 and 114 is a first tuned circuit 160, which is coupled at external chip terminals 8 and 9 and is tuned to the picture carrier frequency, in this example, 45.75 MHz. Diodes 116 and 118 are also coupled across the collectors of transistors 112 and 114 to limit, or clip the reference signal, producing almost a square wave switching signal under strong signal conditions. The square wave switching signal will be of the same frequency and phase as the I.F. picture carrier under optimum signal conditions by virtue of the limiter operation of the differential amplifier and diodes, in combination with the tuned circuit 160.

The amplitude-limited switching signal is applied to the base electrodes of four transistors which are arranged in a dual differential amplifier configuration 136 and 138 in the product detector 130 by emitter follower configured transistors 122 and 124. The differential amplifiers 136 and 138 are driven by the push-pull I.F. signal applied by way of transistors 132 and 134. The transistors comprising differential amplifiers 136 and 138 are switched by the reference signal to achieve product detection of the incoming I.F. signal. Those differential amplifier transistors which receive complementary polarity switching signals in respective differential amplifiers have their collectors connected to form two complementary outputs, across which composite video and intercarrier sound signals are developed. These two outputs may be combined, if desired, in a known fashion to produce a single-ended output for the detected video and intercarrier sound signals.

The reference signal at the collectors of transistors 112 and 114 is also applied to the bases of two transistors 142 and 144. The emitters of these transistors 142 and 144 are coupled together and to ground by a resistive network 143, thereby producing complementary reference drive signals at their emitters. This double-ended reference signal is coupled to differential amplifiers 156 and 158 of the phase comparator 150. The bases of the transistors of the differential amplifiers are driven in a push-pull manner by the reference signal, which is of the same phase and frequency as the I.F. picture carrier.

The reference signal developed across the first tuned circuit 160 is lightly coupled by capacitors 172 and 174 to a second tuned circuit 180, which imparts a frequency-dependent phase shift to the reference signal. When the picture carrier is at the desired frequency, in this example, 45.75 MHz, the reference signal is shifted in phase by 90 degrees by the second tuned circuit, which includes a capacitor 182 and an inductor 184. When the frequency of the picture carrier (and hence, the reference signal) varies from the desired frequency, the second tuned circuit shifts the phase of the reference signal by more or less than 90 degrees.

The second tuned circuit 180 is lightly coupled to the first by small value capacitors 172 and 174. While it may seem advantageous to more tightly couple the AFT tuned circuit to the reference tuned circuit to, for instance, provide a larger drive signal for the phase comparator 150, this will result in degradation of the reference signal. The reference tuned circuit is designed to have a single resonant frequency in the vicinity of the picture carrier frequency. When the two tuned circuits are tightly coupled, the reference tuned circuit will assume the response of an overcoupled, double-tuned network. This double-humped response will cause quadrature distortion and phase nonlinearities in the reference circuit, resulting in poor transient response in detected low frequency luminance signals. Since one of the advantages of the synchronous detector is video transients with faster rise and fall times than envelope detected signals, including the further advantage of symmetrical preshoot and overshoot, care must be taken to ensure that the two tuned circuits are not overcoupled. In some instances, the desired light coupling may be achieved by locating the two tuned circuits in close proximity to each other, thereby dispensing with physical capacitors 172 and 174.

The phase-shifted signal developed across the second tuned circuit 180 is coupled to the phase detector 150 by way of external chip terminals 7 and 10 and emitter follower coupled transistors 146 and 148. D.C. bias at the bases of the emitter follower transistors is provided by a voltage divider 147, coupled between ground and the source of supply voltage. A D.C. path from the voltage divider 147 to transistor 148 is provided by inductor 184. The phase-shifted signal is coupled to the bases of differentially coupled transistors 152 and 154 from the emitter followers 146 and 148. Transistors 152 and 154 are coupled at their emitters, which are also coupled to a constant current source 153. Transistors 152 and 154 have their collectors coupled to drive the dual differential amplifiers 156 and 158 at the emitter electrodes of the respective differential amplifiers. Those transistors in the respective differential amplifiers which are driven by complementary signals at their base electrodes by transistors 142 and 144 have their collectors connected to provide two complementary outputs across which the AFT voltage is developed. These outputs may be coupled to a further differential amplifier in a known manner to develop two opposite-varying AFT output signals of a desired impedance and voltage range.

The reference tuned circuit 160 includes a parallel resonant circuit, including an inductor 162 and a capacitor 164, which is tuned to the picture carrier frequency, in this case, 45.75 MHz. A damping resistor 168 is coupled across the tuned circuit 160 to prevent oscillations in an unshielded tuned circuit 160 when the I.F. amplifier 100 and reference circuit 110 are operating in a high gain condition. A choke 169 is coupled in parallel with the damping resistor 168 to provide a low impedance path for horizontal scanning frequency signals between the collectors of transistors 112 and 114. This choke prevents the reference circuit 110 from ringing at the horizontal scanning frequency, which would produce harmonics appearing as vertical bars in the reproduced image on the kinescope.

In accordance with the present invention, the reference tuned circuit includes a trap circuit, comprising the effective inductance of the parallel resonant circuit 162, 164, and capacitor 166 in the illustrated example. Capacitor 166 is coupled between one junction of inductor 162 and capacitor 164 and terminal 8, and the other junction of inductor 162 and capacitor 164 is coupled to terminal 9. The trap circuit is tuned to produce a notch in the reference circuit response at a frequency which is intermediate the frequency of a 1 MHz offset sound carrier (42.25 MHz), and that picture signal sideband frequency which, upon detection, results in a video signal corresponding to the intercarrier sound second subharmonic frequency (43.5 MHz). The notch is broad enough to provide significant attenuation at both of these frequencies. The reference signal produced by this tuned circuit will have reduced quadrature distortion, particularly at the frequency which produces second harmonics that cause the sound buzz problem. The reference signal will also be attenuated at the frequency of the color subcarrier (42.17 MHz), which will minimize the problem of chroma-sound beats in the detected video signal.

The reference signal which is coupled to the second tuned circuit 180 from tuned circuit 160 will also exhibit the frequency notch, which will reduce the width of the mid-band portion of the AFT response characteristic. The AFT response characteristic will thus be balanced, with two, substantially equal pull-in ranges on opposite sides of the desired picture carrier frequency, making the AFT circuit more immune to noise pulling. The notch will also virtually eliminate any AFT voltage contribution of an offset sound carrier at 42.25 MHz, thereby enabling the AFT circuit to acquire the frequency offset picture carrier at 46.75 MHz.

Figure 7:
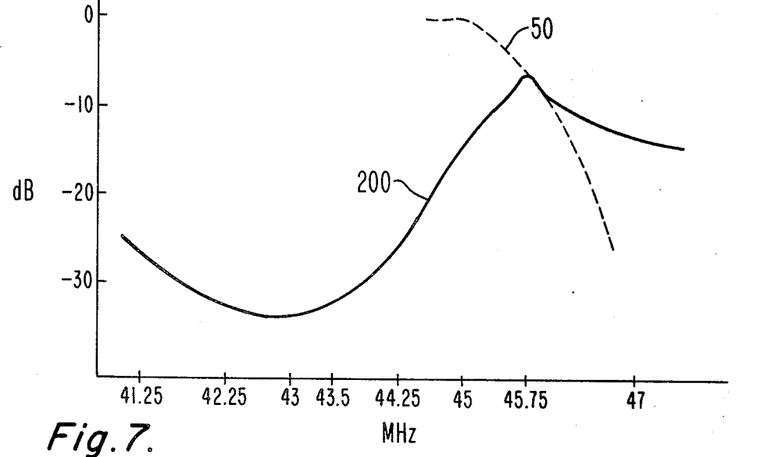
FIG. 7 illustrates a typical reference signal response characteristic of the circuit of FIG. 6.
Figure 8:
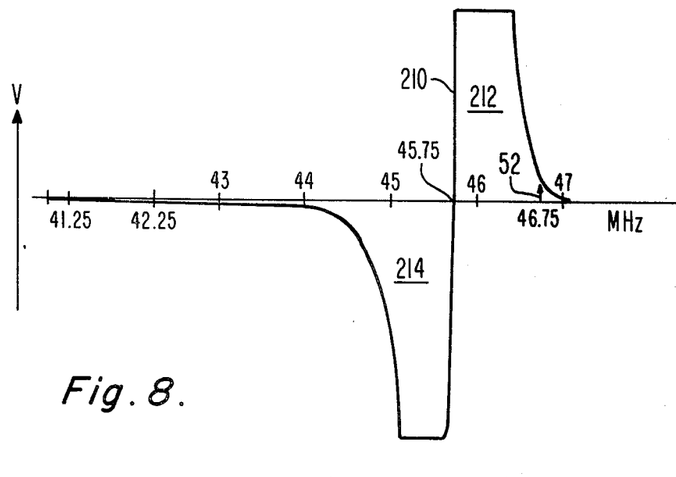
FIG. 8 illustrates a typical AFT response characteristic of the circuit of FIG. 6.

The circuit of FIG. 6 was constructed and tested, and the response curves of FIGS. 7 and 8 were recorded. The reference tuned circuit response characteristic 200 is shown in FIG. 7, superimposed over the Nyquist slope 50 of the I.F. passband. The notch produced by the reference trap is located at approximately 42.9 MHz, which is seen to attenuate the picture signal sideband frequency corresponding to the intercarrier sound second subharmonic frequency, 43.5 MHz, by approximately 32 db, compared with the 16 db level of attenuation of the same frequency in FIG. 3. The picture signal sideband frequency which, upon detection, results in a video signal which corresponds to the intercarrier sound third subharmonic frequency, 44.25 MHz, is seen to be attenuated by 25 db in FIG. 7, compared with its 14 db level of attenuation in FIG. 3. It may also be seen in FIG. 7 that when the reference tuned circuit response curve is combined with the Nyquist slope of the I.F. passband, the composite response is substantially symmetrical about the I.F. picture carrier frequency of 45.75 MHz, which further reduces quadrature distortion in the reference circuit by amplitude balancing the video sidebands.

The effects of the reference tuned circuit trap on the AFT response is shown in FIG. 8. The AFT response curve 210 is seen to be balanced, having two substantially equal positive and negative pull-in areas 212 and 214 between the response curve 210 and the reference axis. The substantially equal pull-in areas on either side of the picture carrier frequency improve the immunity of the AFT circuit to noise pulling. Also, the broad notch virtually eliminates any voltage contribution at 42.25 MHz, the frequency of a 1 MHz offset sound carrier. This is because the notch of the reference tuned circuit trap affects both the reference signal, which is coupled to the differential amplifiers 156, 158 in the phase detector 150, and the phase-shifted reference signal which is applied to the phase detector 150 by way of the second tuned circuit 180. Thus, the sound carrier has been trapped out of both signals which are applied to the phase detector 150 for the development of an automatic frequency control signal.

This is particularly important when the AFT circuit is used in conjunction with an FS tuning system. The stability of the FS system is dependent upon the linearity of the AFT response curve 210 in the vicinity of the desired picture carrier frequency, illustratively shown as 45.75 MHz in FIG. 8. When the sound carrier is trapped out of the AFT detector inputs, the control signal produced is responsive solely to the picture carrier, which will produce a linear response consistent with response curve 210. If the sound carrier were not trapped out of the AFT detector inputs, the sound carrier would make a voltage contribution to the control signal, which contribution would disturb the linearity of the control signal in the vicinity of 45.75 MHz. The stability of the FS tuner would be deleteriously affected accordingly. It is thus apparent that the AFT circuit of the present invention will be controlled by a 1 MHz offset picture carrier at 46.75 MHz, and will cause the tuner to successfully acquire this offset signal.

Figure 9:
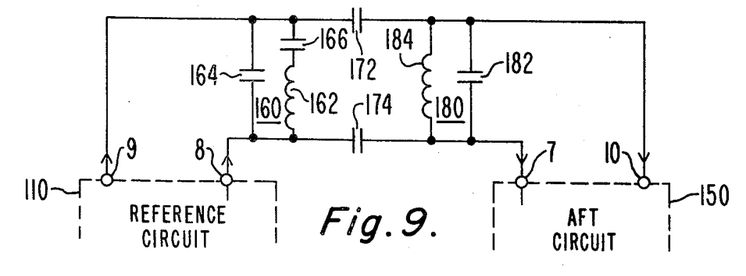
FIG. 9 illustrates in schematic diagram form an alternate embodiment of the selectivity network of FIG. 6.

An alternate embodiment of the tuned circuits of the present invention is shown in FIG. 9. This embodiment differs from the arrangement of FIG. 6 in that capacitor 164 is in parallel with the series combination of capacitor 166 and inductor 162 across terminals 8 and 9. The combination of capacitor 164 and the effective inductance of inductor 162 and capacitor 166 is resonant at the picture carrier frequency, while the combination of inductor 162 and capacitor 166 provides trapping at the aforementioned intermediate frequency. The remaining elements are arranged in the same configuration as shown in FIG. 6 and bear the same reference numerals.

The present invention may be easily implemented for use with the PAL television system by readjusting the tuning frequencies in consonance with the PAL standards. The reference tuned circuit is then resonant at the PAL I.F. picture carrier frequency of 38.9 MHz. The PAL sound carrier is located at 33.4 MHz, and the intercarrier sound signal thus has a fundamental frequency of 5.5 MHz and a second subharmonic frequency at 36.15 MHz in the I.F. band. The reference tuned circuit notch is therefore located intermediate the sound carrier offset by 1 MHz, or 34.4 MHz, and the I.F. frequency corresponding to video signals having second harmonics at the intercarrier sound frequency, 36.15 MHz. The second tuned circuit must also be re-tuned to provide a 90 degree phase shift at the PAL I.F. picture carrier frequency.

In the embodiment of the present invention illustratively shown in FIG. 6, the product detector 130 detects both the video and intercarrier sound signals. It may be desirable in a particular embodiment to process the sound information in a separate channel prior to video detection. In such an embodiment, the sound carrier may be trapped out of the I.F. signal prior to generation of the reference signal and video and AFT detection. The problems of sound buzz and sound carrier acquisition by the AFT detector would consequently not be present. However, the novel selectivity network of the present invention would nonetheless be desirable in the television receiver to balance the video sidebands about the picture carrier in the reference signal. The notched reference signal would also provide a balancing of the AFT response characteristic about the desired picture carrier frequency, as discussed previously. The selectivity network would thus simultaneously provide the benefits of reduced quadrature distortion in the video detector and improved AFT noise immunity for the television receiver. Since it is not necessary to attenuate the sound carrier frequency in the reference channel, the trap of tuned circuit 160 may be tuned to or even about 43.5 MHz in an NTSC system, the frequency which is equidistant the sound and picture carrier frequencies. The Q of the trap circuit may also be higher than that which is desirable in the embodiment of FIG. 6.

What is claimed is:
1. In a television receiver, apparatus for processing an intermediate frequency television signal which occupies a passband including a picture carrier frequency and a sound carrier frequency comprising:
   a phase detector having first and second inputs, third and fourth inputs, means coupled between said third and fourth inputs for imparting a frequency-dependent phase shift to signals applied thereto, and an output for producing a tuning correction signal indicative of the deviation of said picture carrier from its desired frequency; and a product detector having first and second inputs coupled to receive said intermediate frequency signal, third and fourth inputs, and first and second outputs for producing a detected video signal; and a reference circuit, having first and second inputs coupled to receive said intermediate frequency television signal, and first and second output terminals respectively coupled to said first and second inputs of said phase detector, to said third and fourth inputs of said phase detector, and to said third and fourth inputs of said product detector, and including selectivity means for providing a characteristic response at said output terminals which (1) substantially balances first and second opposite polarity response curves of said phase detector about the desired frequency of said picture carrier,
(2) reduces the contribution to said tuning correction signal provided by signals at said sound carrier frequency, (3) substantially balances the amplitude versus frequency response at said first and second terminals about said desired picture carrier frequency, and (4) provides substantial attenuation at that picture signal sideband frequency which, upon detection, results in a video signal corresponding to the intercarrier sound second subharmonic frequency, wherein said selectivity means comprises a single, double-tuned circuit which provides a response pole at said desired picture carrier frequency, and a response zero at a given frequency which is between said sound carrier frequency and a frequency which is equidistant between said sound and picture carrier frequencies.

2. In a television receiver, apparatus for processing an intermediate frequency television signal which occupies a passband including a picture carrier frequency and a sound carrier frequency comprising:

a reference circuit, having first and second inputs coupled to receive said intermediate frequency television signal, and first and second output terminals for producing a reference signal;

a phase detector having first and second inputs coupled to said first and second output terminals, third and fourth inputs, and an output for producing a tuning correction signal indicative of the deviation of said picture carrier from its desired frequency;

a product detector having first and second inputs coupled to receive said intermediate frequency signal, third and fourth inputs coupled to said first and second output terminals of said reference circuit, and an output for producing a detected video signal;

a first inductor;

a first capacitor, coupled in parallel with said first inductor to form a first parallel combination;

a second capacitor coupled in series with said first parallel combination between said first and second output terminals, wherein said first parallel combination is tuned to peak the response at said output terminals at the desired frequency of said picture carrier, and said second capacitor is tuned in cooperation with said first parallel combination to provide attenuation at said output terminals, relative to the level of said picture carrier and in addition to that provided by said first parallel combination, at said sound carrier frequency and about a frequency located equidistant said sound and picture carriers;

a second inductor;

a third capacitor coupled in parallel with said second inductor to form a second parallel combination which is coupled between said third and fourth inputs of said phase detector and tuned to impart a frequency-dependent phase shift to signals applied thereto; and means for capacitively coupling signals from said first and second output terminals to said second parallel combination.

3. In a television receiver, apparatus for processing an intermediate frequency television signal which occupies a passband including a picture carrier frequency and a sound carrier frequency comprising:

a reference circuit, having first and second inputs coupled to receive said intermediate frequency television signal, and first and second output terminals for producing a reference signal;

a phase detector having first and second inputs coupled to said first and second output terminals, third and fourth inputs, and an output for producing a tuning correction signal indicative of the deviation of a picture carrier from its desired frequency;

a product detector having first and second inputs coupled to receive said intermediate frequency signal, third and fourth inputs coupled to said first and second output terminals of said reference circuit, and an output for producing a detected video signal;

a first inductor;

a first capacitor coupled in series with said first inductor between said first and second output terminals and tuned in conjunction therewith to attenuate those video sidebands at said output terminals which are located equidistant said sound and picture carrier frequencies;

a second capacitor coupled in parallel with said first capacitor and first inductor and tuned in cooperation therewith to peak the response at said output terminals in the vicinity of the desired location of said picture carrier;

a second inductor;

a third capacitor coupled in parallel with said second inductor between said third and fourth inputs of said phase detector and tuned in cooperation therewith to impart a frequency-dependent phase shift to signals applied thereto; and means for capacitively coupling signals from said first and second output terminals to said second inductor and third capacitor.

4. In a television receiver, including a tuner for converting a radio frequency television signal to an intermediate frequency television signal, which includes a picture carrier of a first frequency and a sound carrier of a second frequency, said tuner further including means exhibiting a given search frequency range for acquiring said picture carrier, apparatus for processing said intermediate frequency television signal comprising:

(a) a synchronous detector circuit for producing a detected video signal and an intercarrier sound signal, including a reference circuit, including a differential amplifier having first and second inputs coupled to receive said intermediate frequency television signal, and first and second output terminals for producing a reference signal, and a product detector having first and second inputs coupled to receive said intermediate frequency television signal, third and fourth inputs coupled to said first and second output terminals of said differential amplifier, and first and second outputs for producing said detected video and intercarrier sound signals;

(b) an automatic fine tuning circuit for producing a tuning correction signal, including a phase detector having first and second inputs coupled to said first and second output terminals of said differential amplifier, third and fourth inputs for receiving a phase-shifted reference signal, and an output coupled to said tuner acquiring means for producing a tuning correction signal indicative of the difference in phase between said reference signal and said phase-shifted reference signal; and (c) a selectivity network, including a first tuned circuit, coupled between said first and second output terminals of said differential amplifier, which exhibits parallel resonance at the desired frequency of said picture carrier and series resonance at a frequency intermediate (A) a third frequency located between said sound carrier frequency and said picture carrier frequency and offset from said sound carrier frequency by a frequency increment substantially equal to one-half of said given search range and (B) that picture signal sideband frequency which, upon detection, results in a video signal corresponding to the intercarrier sound second subharmonic frequency, and a second tuned circuit coupled between first and second output terminals of said differential amplifier and said third and fourth inputs of said phase detector and tuned to impart a frequency dependent phase shift to signals applied thereto, wherein said parallel resonance of said first tuned circuit peaks the response of said reference signal at the desired frequency of said picture carrier, and said series resonance of said first tuned circuit (1) attenuates the sound carrier frequency in the input signals supplied to said phase detector in a manner so as to balance the response characteristic of said phase detector about said desired picture carrier frequency, while reducing the contribution of signals located between said sound carrier and said third frequencies to the tuning correction signal, (2) substantially balances the level of those video sidebands located about said picture carrier frequency at said first and second output terminals, thereby reducing quadrature distortion in said reference circuit, and (3) provides substantial attenuation at that picture signal sideband frequency at said first and second output terminals which, upon detection, results in a video signal corresponding to the intercarrier sound second subharmonic frequency.

5. The apparatus of claims 1, 2, 3, or 4, wherein said reference circuit comprises a limiter.

6. The apparatus of claim 5, further comprising first and second capacitors for lightly coupling said first and second output terminals to said third and fourth inputs of said phase detector.

7. In a television receiver, apparatus for processing an intermediate frequency television signal which occupies a passband including a picture carrier frequency and a sound carrier frequency comprising:

a reference circuit, having first and second inputs coupled to receive said intermediate frequency television signal, and first and second output terminals for producing a reference signal;

a phase detector having first and second inputs coupled to said first and second output terminals, third and fourth inputs, and an output for producing a tuning correction signal indicative of the deviation of said picture carrier from its desired frequency;

a product detector having first and second inputs coupled to receive said intermediate frequency signal, third and fourth inputs coupled to said first and second output terminals of said reference circuit, and an output for producing a detected video signal;

a first inductor;

a first capacitor, coupled in parallel with said first inductor to form a first parallel combination;

a second capacitor coupled in series with said first parallel combination between said first and second output terminals, wherein said first parallel combination is tuned to peak the response at said output terminals at the desired frequency of said picture carrier, and said second capacitor is tuned in cooperation with said first parallel combination to provide attenuation at said output terminals, relative to the level of said picture carrier and in addition to that provided by said first parallel combination, at said sound carrier frequency and about a frequency located equidistant said sound and picture carriers;

a second inductor;

a third capacitor coupled in parallel with said second inductor to form a second parallel combination which is coupled between said third and fourth inputs of said phase detector and tuned to impart a frequency-dependent phase shift to signals applied thereto; and means for coupling signals from the combination including said first inductor, said first capacitor and said second capacitor to said second parallel combination.

* * * * *